(12) United States Patent
Dinescu et al.

(10) Patent No.: US 11,565,610 B2
(45) Date of Patent: Jan. 31, 2023

(54) CHILD SAFETY SEAT WITH BELT TENSIONER

(71) Applicant: CLEK INC., Toronto (CA)

(72) Inventors: Iuliu Dinescu, Toronto (CA); Giuseppe Rotiroti, Toronto (CA)

(73) Assignee: CLEK INC., Toronto (CA)

( * ) Notice: Subject to any disclaimer, the term of this patent is extended or adjusted under 35 U.S.C. 154(b) by 124 days.

(21) Appl. No.: 17/282,178

(22) PCT Filed: Oct. 1, 2019

(86) PCT No.: PCT/CA2019/051406
§ 371 (c)(1),
(2) Date: Apr. 1, 2021

(87) PCT Pub. No.: WO2020/069613
PCT Pub. Date: Apr. 9, 2020

(65) Prior Publication Data
US 2022/0009384 A1    Jan. 13, 2022

Related U.S. Application Data

(60) Provisional application No. 62/739,847, filed on Oct. 1, 2018.

(51) Int. Cl.
*B60N 2/28* (2006.01)
(52) U.S. Cl.
CPC ......... *B60N 2/2806* (2013.01); *B60N 2/2821* (2013.01); *B60N 2002/2815* (2013.01)
(58) Field of Classification Search
CPC .............. B60N 2/2806; B60N 2/2821; B60N 2002/2815
See application file for complete search history.

(56) References Cited

U.S. PATENT DOCUMENTS 5,611,596 A * 3/1997 Barley ................. B60N 2/2821
297/363
6,371,563 B1    4/2002 Washizuka
(Continued)

FOREIGN PATENT DOCUMENTS

EP    1623892 A1    2/2006
EP    2865561 A1 *  4/2015  .............. B60N 2/26
GB    2506220 A  *  3/2014  ............. B60N 2/265

OTHER PUBLICATIONS

ISA/CA, ISR issued in PCT/CA2019/051406, dated Jan. 3, 2020, 2 pgs.

*Primary Examiner* — David R Dunn
*Assistant Examiner* — Tania Abraham
(74) *Attorney, Agent, or Firm* — Greenberg Traurig, LLP

(57) ABSTRACT

A seat base includes a base, an arm and a release mechanism. The base includes a capture mechanism. The arm is coupled to the base and rotates through release, tension and unloaded positions. The arm frictionally engages a vehicle belt disposed between the arm and the base. The belt is disengaged from the arm when the arm is disposed in the release position. The capture mechanism is movable between an engaged position in which the arm is precluded from moving into the release position, and a disengaged position in which the arm is free to move into the release position. When the arm is disposed in the tension position and the capture mechanism is disposed in the engaged position, the capture mechanism is precluded from moving into the disengaged position. The release mechanism releases the arm from the capture mechanism when the arm is disposed in the unloaded position

10 Claims, 18 Drawing Sheets

(56) References Cited

U.S. PATENT DOCUMENTS

| | | | | |
|---|---|---|---|---|
| 6,508,510 B2* | 1/2003 | Yamazaki | ............ | B60N 2/2806 |
| | | | | 297/250.1 |
| 7,370,913 B2 | 5/2008 | Takamizu et al. | | |
| 8,322,788 B2* | 12/2012 | Williams | ............ | B60N 2/2821 |
| | | | | 297/256.16 |
| 8,573,695 B2* | 11/2013 | Van Geer | ............ | B60N 2/2806 |
| | | | | 297/256.16 |
| 10,040,377 B2* | 8/2018 | Mason | ................ | B60N 2/2845 |
| 10,189,381 B2* | 1/2019 | Williams | ............ | B60N 2/2806 |
| 2005/0146183 A1* | 7/2005 | Langmaid | ............ | B60N 2/2806 |
| | | | | 297/256.1 |
| 2005/0156452 A1 | 7/2005 | Biaud | | |
| 2006/0261651 A1* | 11/2006 | Nolan | ................ | B60N 2/2821 |
| | | | | 297/250.1 |
| 2009/0066131 A1* | 3/2009 | Hendry | ................ | B60N 2/2845 |
| | | | | 297/256.16 |
| 2010/0187880 A1* | 7/2010 | Heisey | ................ | B60N 2/2806 |
| | | | | 297/256.16 |
| 2011/0272985 A1* | 11/2011 | Fritz | ..................... | B60N 2/265 |
| | | | | 297/253 |
| 2013/0119732 A1* | 5/2013 | Wuerstl | ............... | B60N 2/2806 |
| | | | | 297/253 |
| 2016/0347212 A1* | 12/2016 | Mason | ................ | B60N 2/2821 |
| 2018/0099588 A1* | 4/2018 | Anderson | ............. | B60N 2/286 |
| 2018/0345827 A1* | 12/2018 | Anderson | ............ | B60N 2/2821 |

* cited by examiner

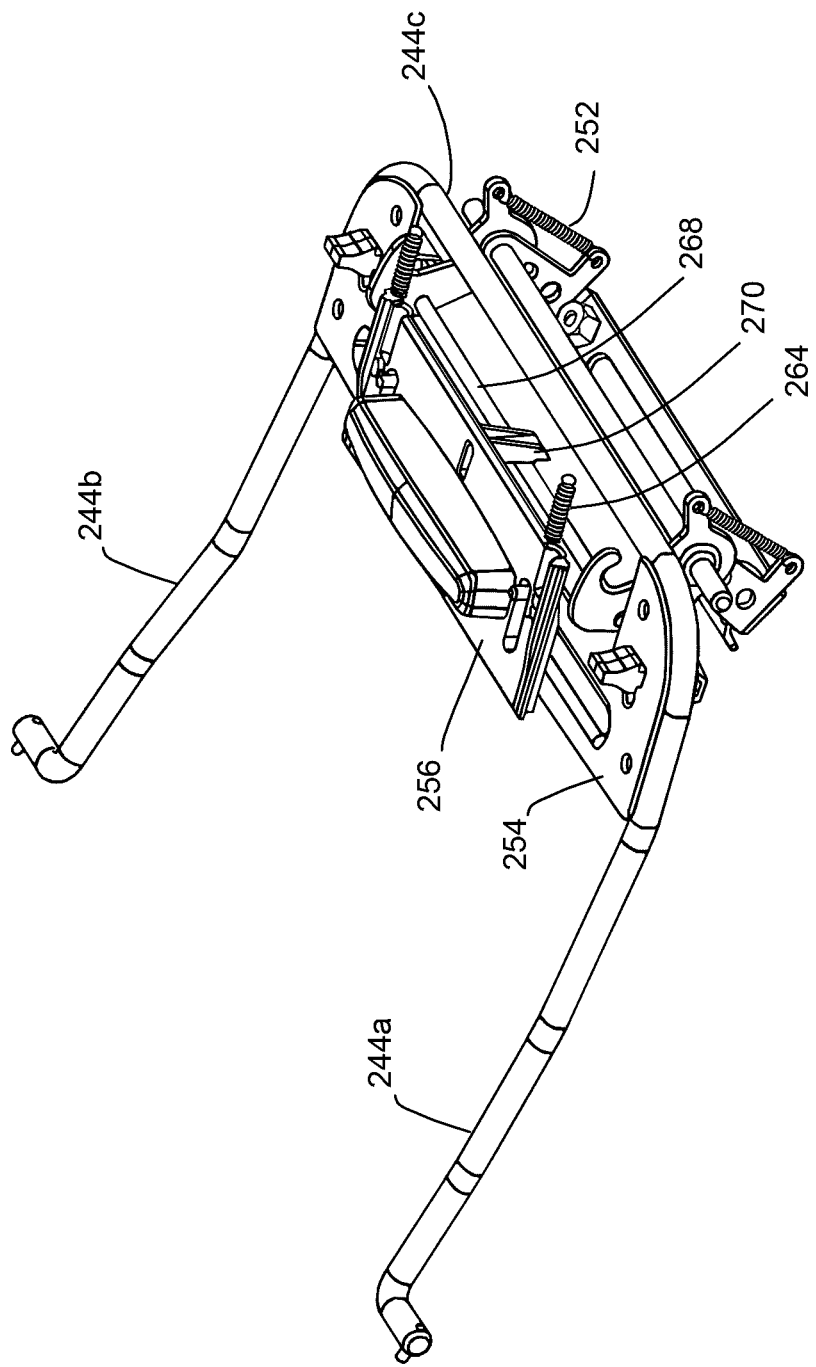

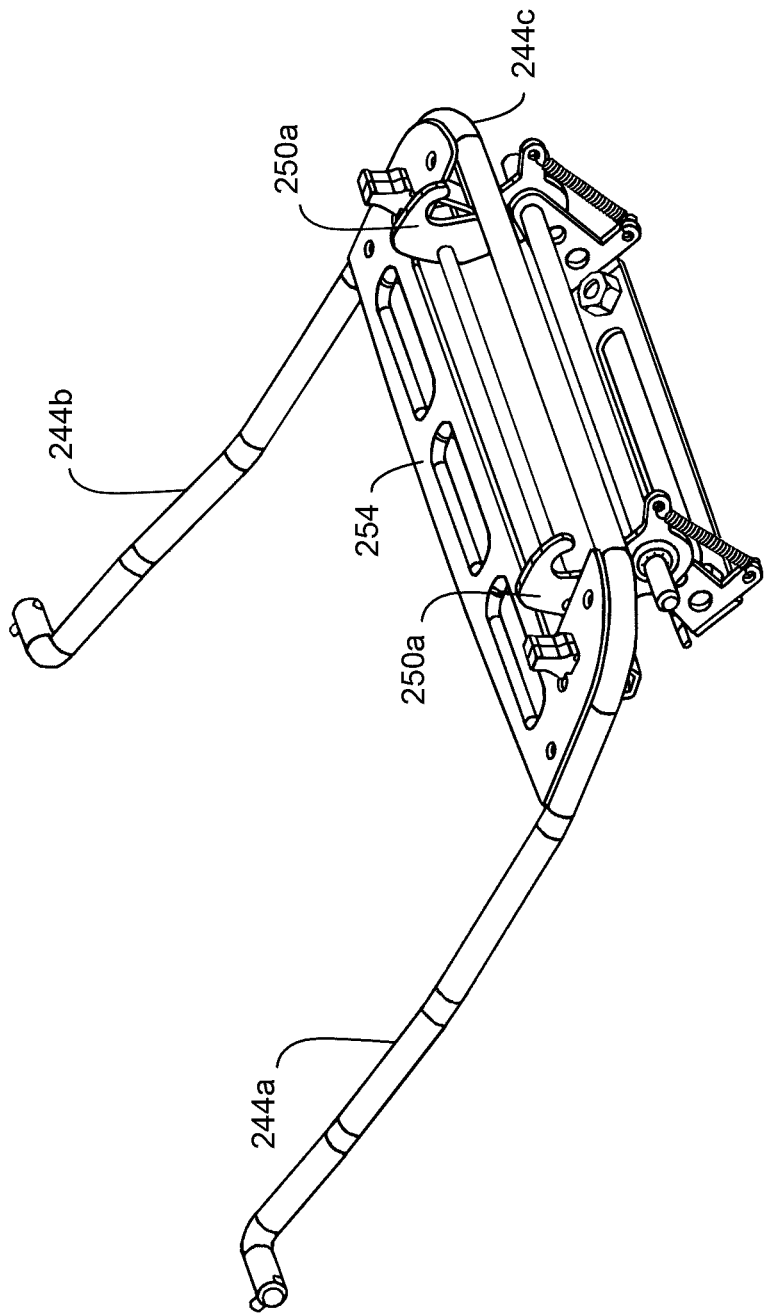

CHILD SAFETY SEAT WITH BELT TENSIONER

FIELD

This patent application relates to a safety seat intended for installation in an automotive vehicle.

BACKGROUND

A child traveling in a motor vehicle is particularly vulnerable to injury from impact forces when the vehicle stops suddenly. Efforts have been made to develop child safety seats that reduce the effect of these forces on the child.

SUMMARY

As described in this patent application, there is provided a child safety seat that includes an integrated belt tensioning system that applies tension to a vehicle seat lap belt or lap/shoulder belt (hereinafter "vehicle belt") that may be connected to the child safety seat and thereby secures the child safety seat to the vehicle seat.

The child safety seat includes a seat base, and a seat body that is detachably coupled to the seat base. The seat base includes a base portion and a belt tensioning system.

The belt tensioning system includes a tensioning arm, a release mechanism and a capture mechanism. The tensioning arm is pivotably coupled to the base portion and is movable through a release position, a tension position and an unloaded position. The tensioning arm is also configured to frictionally engage a vehicle belt that is disposed between the tensioning arm and the base portion when the tensioning arm is disposed in the tension and unloaded positions. Conversely, the vehicle belt is disengaged from the tensioning arm when the tensioning arm is disposed in the release position.

The release mechanism is coupled to the tensioning arm. The capture mechanism is coupled to the base portion and is movable between (i) an engaged position in which the tensioning arm is precluded by the capture mechanism from moving into the release position, and (ii) a disengaged position in which the tensioning arm is free to move into the release position.

When the tensioning arm is disposed in the tension position and the capture mechanism is disposed in the engaged position, the vehicle belt applies a load to the capture mechanism via the tensioning arm and the capture mechanism is precluded from moving into the disengaged position. Conversely, when the tensioning arm is disposed in the unloaded position, the release mechanism is configured to release the tensioning arm from the capture mechanism, and the load is removed from the capture mechanism.

BRIEF DESCRIPTION OF THE DRAWINGS

The child safety seat will now be described, by way of example, with reference to the accompanying drawings, in which:

FIG. 17 is a top perspective view of the belt tensioning system shown in FIG. 16, but with elements removed to be better show the capture mechanism and the release mechanism; and FIG. 18, is a top perspective view of the belt tensioning system as shown in FIG. 17, but depicted without the release mechanism.

DETAILS

Figure 1:
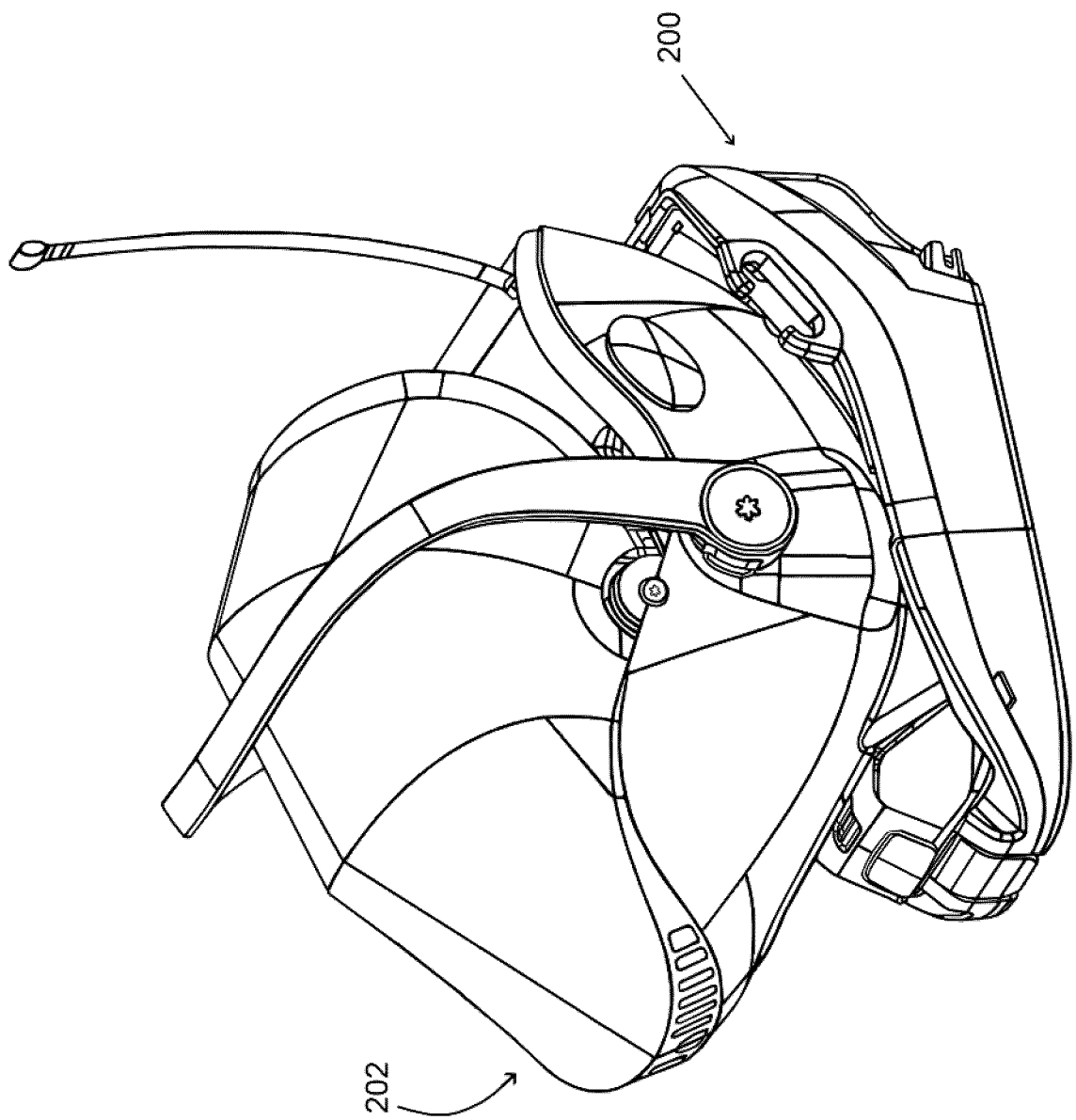
FIG. 1 is a front perspective view of the child safety seat, depicting the seat body and the seat base.
Figure 8:
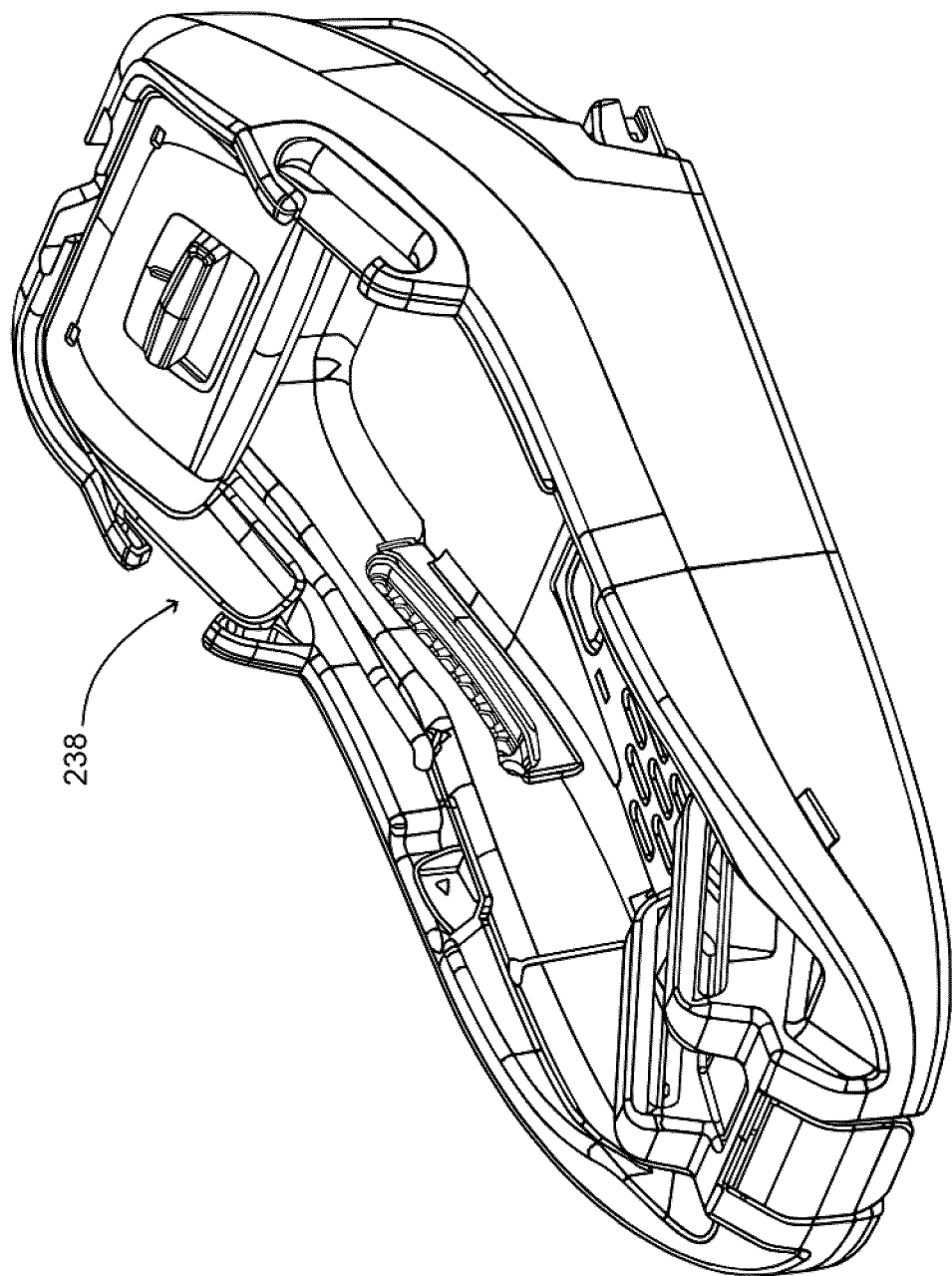
FIG. 8 is a front perspective view of the seat base, depicted without the sled assembly but with the belt tensioning system in a tension position.

Turning to FIG. 1, there is shown a child safety seat 100 as configured for installation in a motor vehicle, such as a car or truck. As shown, the child safety seat 100 includes a seat base 200 and a seat body 202. The child safety seat 100 may also include a rigid latch mechanism (see, e.g. FIG. 8) for securing the safety seat 100 to a LATCH (Lower Anchors and Tethers for CHildren) system that may be provided in the motor vehicle.

The safety seat 100 may be installed in the motor vehicle by placing the seat base 200 on a vehicle seat, and securing the seat 100 to the motor vehicle by attaching a lap belt or lap/shoulder belt ("vehicle belt") to the seat base 200 and/or interfacing the rigid latch mechanism with corresponding LATCH system anchors that may be fixed to the vehicle proximate the rear of the vehicle seat.

Figure 2:
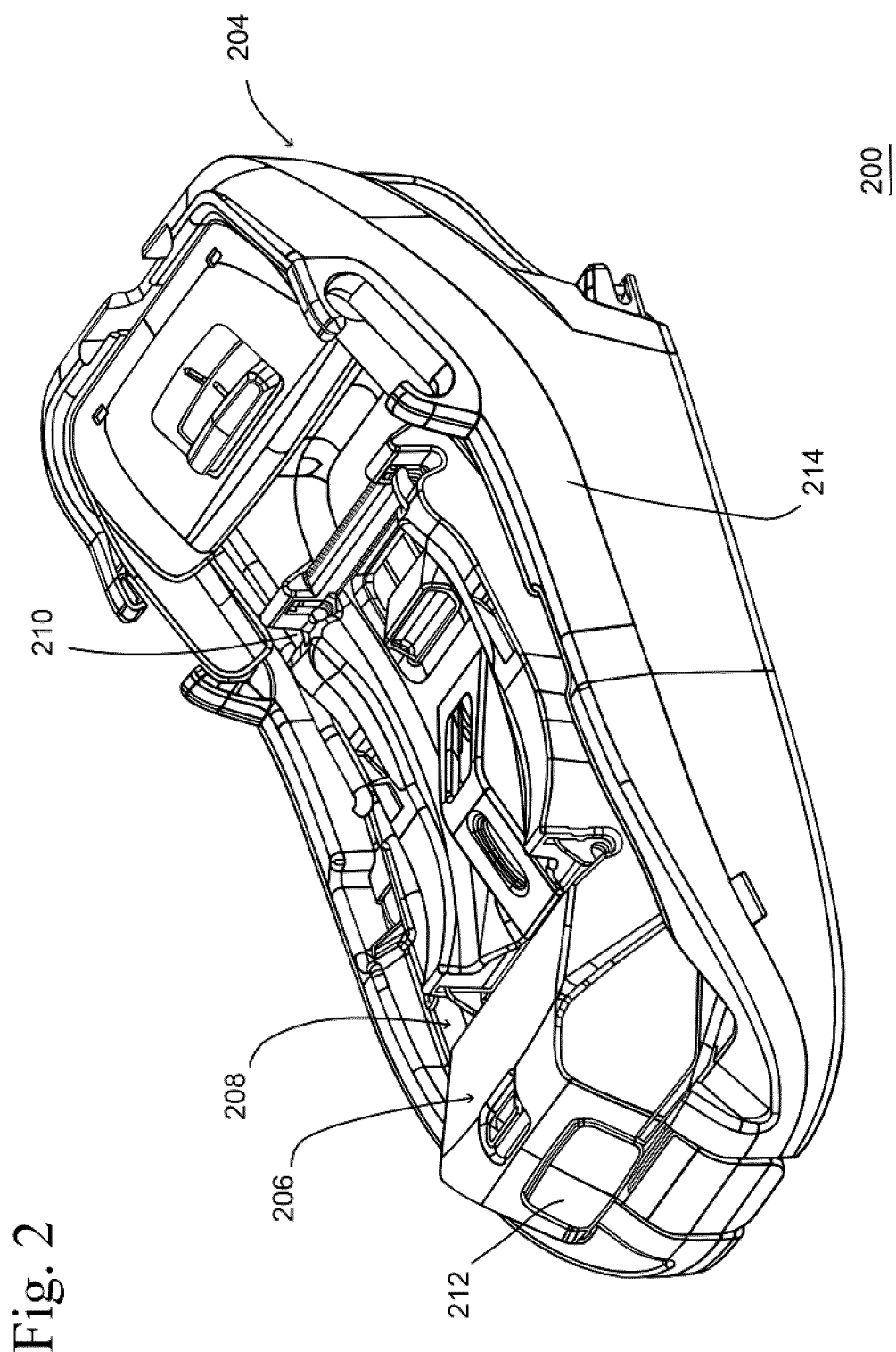
FIG. 2 is a front perspective view of the seat base, depicting the base portion and the sled assembly.

As shown in FIG. 2, the seat base 200 may include a base portion 204, and a sled assembly 206. The seat body 202 may be detachably coupled to the sled assembly 206, and the sled assembly 206 may be slidably coupled to the base portion 204 to thereby allow the incline angle of the sled assembly 206 (and therefore, the incline angle of the seat body 202) to be manually adjusted.

In FIGS. 3-18, the base portion 204 is depicted without certain exterior features to thereby better illustrate some of the interior features thereof.

Figure 3:
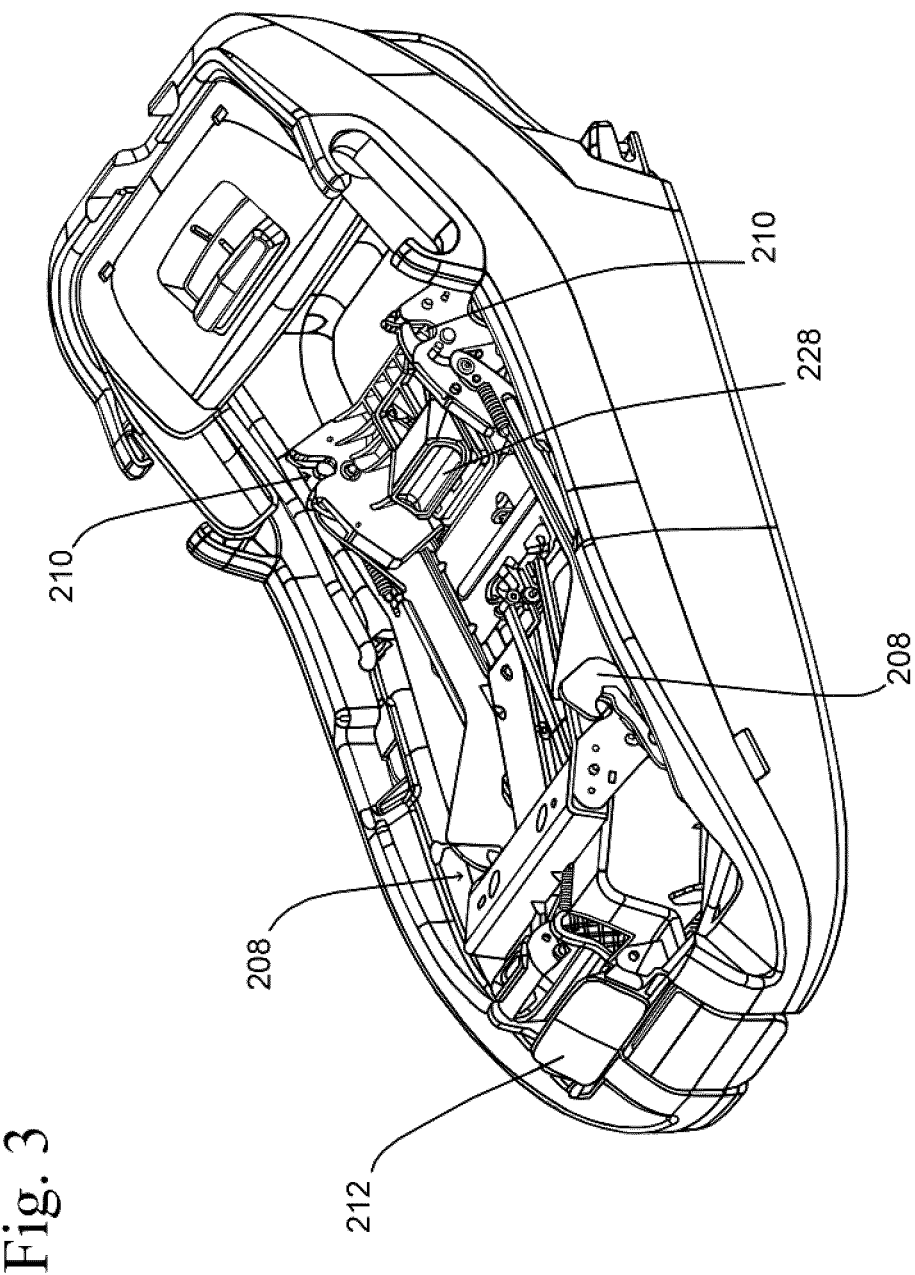
FIG. 3 is a front perspective view of the seat base, depicted without the sled assembly cover plate, exposing details of the seat body attachment/release mechanism.

As shown in FIGS. 2 and 3, the sled assembly 206 includes a pair of front latches 208, a pair of rear latches 210, and a seat release lever 212 that is coupled to the latches 208, 210. The latches 208, 210 extend through the upper cover plate of the sled assembly 206 and rotate between a closed position and an open position when the seat release lever 212 is actuated. The latches 208, 210 are oriented to capture corresponding pins provided on the underside of the seat body 202. Therefore, the seat body 202 may be secured to the top surface of the sled assembly 206 via the latches 208, 210, and may be detached from the sled assembly 206 (see, e.g. FIG. 2) by actuating the seat release lever 212 (thereby opening the latches 208, 210), leaving the seat base 200 (and the sled assembly 206) secured to the motor vehicle.

Figure 4:
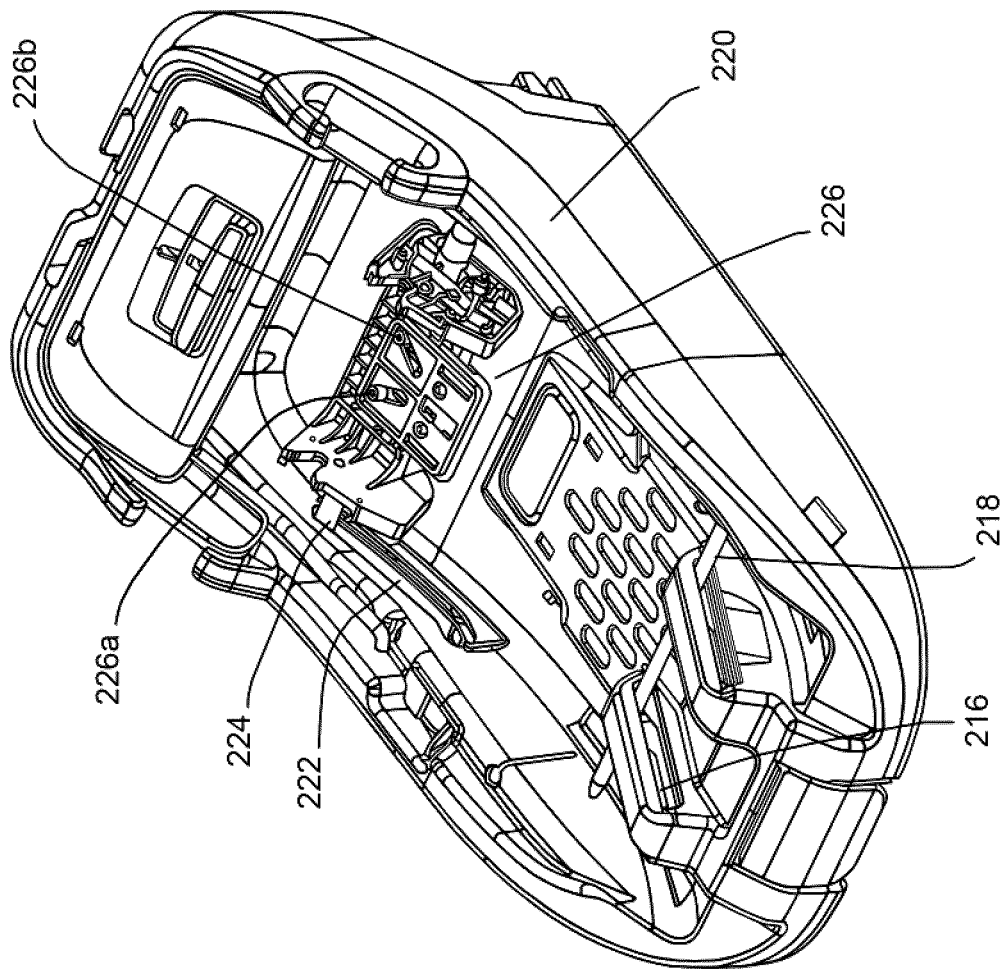
FIG. 4 is a front perspective view of the seat base, depicted without the sled assembly, exposing details of the sled incline angle adjustment mechanism.
Figure 5:
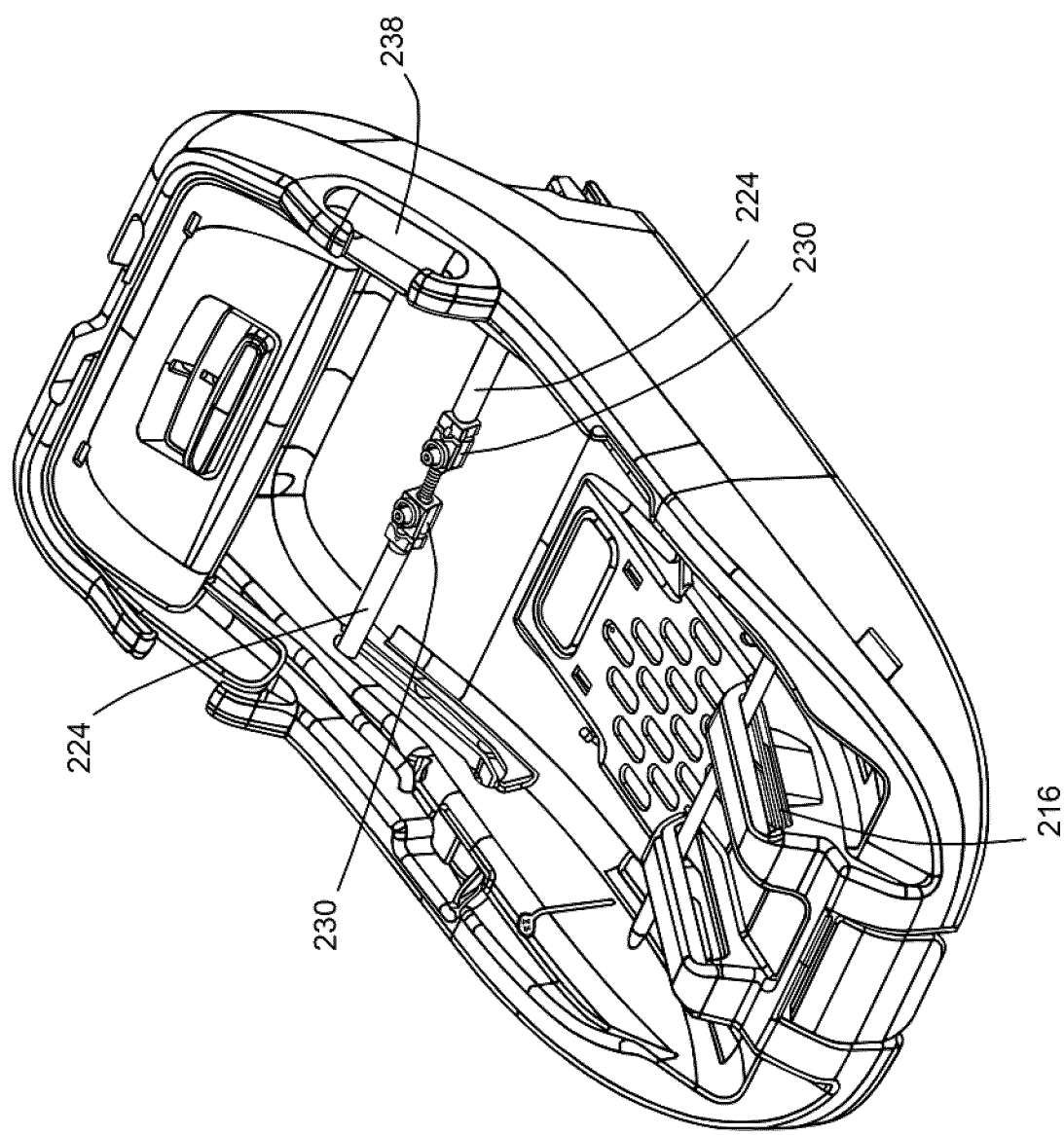
FIG. 5 is a front perspective view of the seat base, depicting additional details of the sled incline angle adjustment mechanism.
Figure 6:
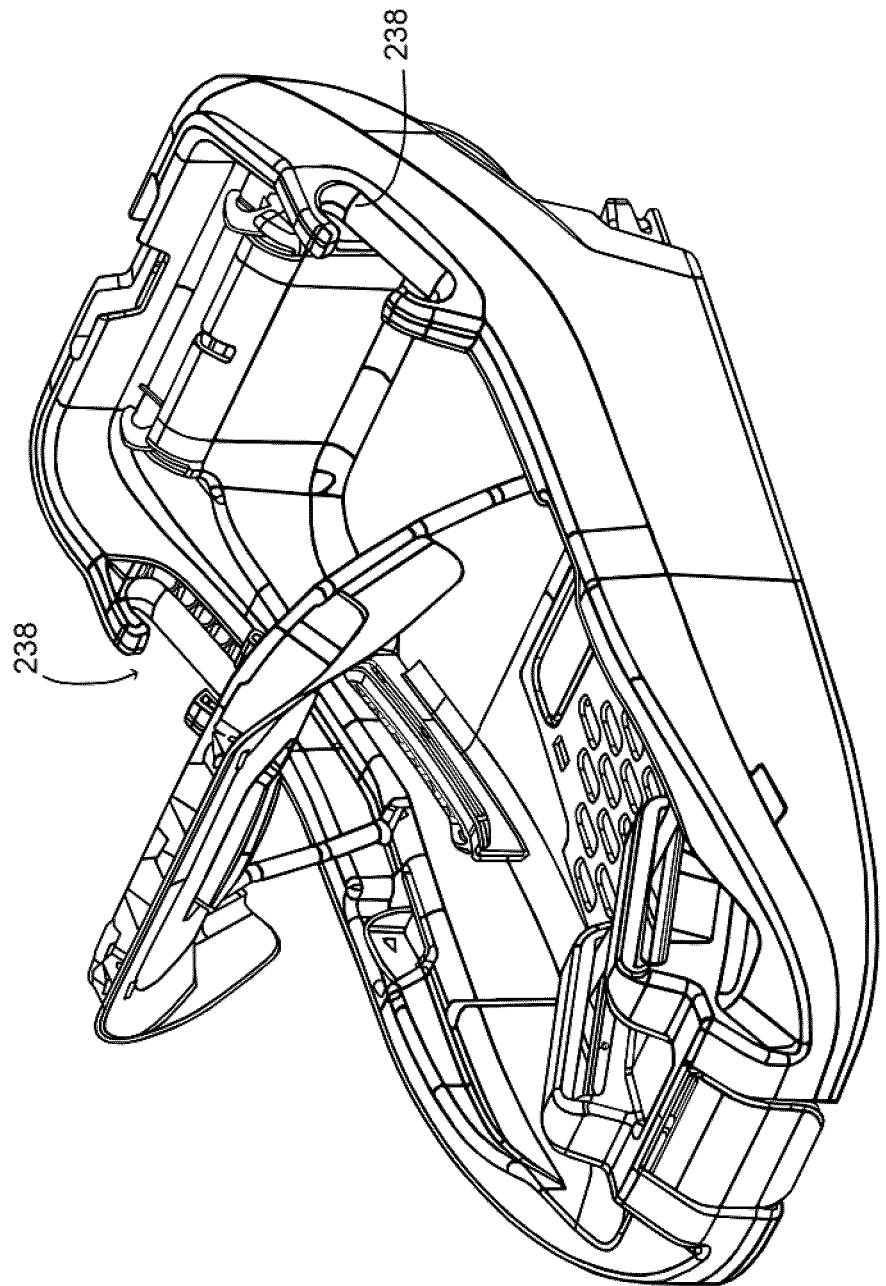
FIG. 6 is a front perspective view of the seat base, depicted without the sled assembly but with the belt tensioning system in a release position.
Figure 7:
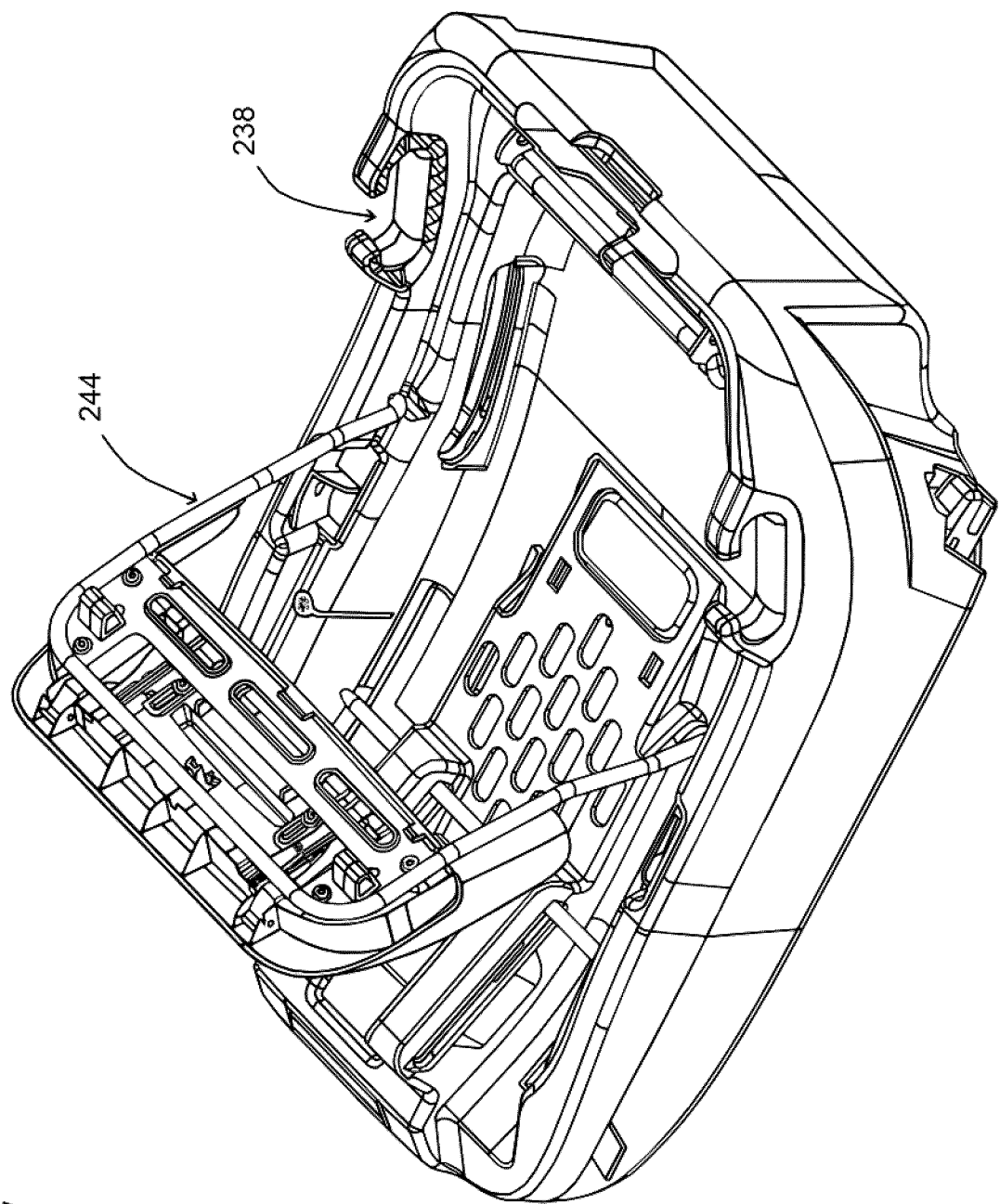
FIG. 7 is a rear perspective view of the seat base, as depicted in FIG. 6.

The sled assembly 206 includes a pair of sled side walls 214, and a mounting hole (not shown) that is provided in each of the sled side walls 214. As shown in FIG. 4, the base portion 204 includes a front elongate slide channel 216, and the sled assembly 206 may be coupled to the base portion 204 via a slide rod 218 that is retained within the mounting holes and extends through the front slide channel 216.

As shown in FIG. 4, the base portion 204 also includes a pair of base sides 220, and a rear elongate slide channel 222 that is provided in each of the base sides 220. The sled assembly 206 also includes a pair of retractable locking pins 224, an A-shaped pin guide 226 and an incline adjustment lever 228. The locking pins 224 extend through (and retract from) the sled side walls 214 along a transverse axis extending between the base sides 220. The pin guide 226 includes a pair of guide channels 226a, 226b that are disposed at an acute (e.g. 45 degree) angle relative to the axis of the locking pins 224.

Each locking pin 224 is coupled to the pin guide 226 via a pin block 230 (see, e.g. FIG. 5) that is provided on an inner end of the locking pin 224 and extends through a respective one of the guide channels 226a, 226b. Each rear slide channel 222 includes a plurality of pin holes (not shown), and the retractable locking pins 224 extend from the pin guide 226 into a respective one of the pin holes.

The incline adjustment lever 228 is coupled to the pin guide 226. Actuation of the incline adjustment lever 228 pulls the pin guide 226 along an axis perpendicular to the axis of the locking pins 224, in a direction away from the rear of the sled assembly 206, thereby causing the pin blocks 230 and the locking pins 224 to move inwardly towards the centre of the sled assembly 206.

As shown, the front slide channel 216 of the base portion 204 has a major axis, and the rear slide channel 222 has a major axis that is not parallel to the major axis of the front slide channel 216. Before the safety seat installer attaches the seat body 202 to the seat base 200, the safety seat installer may adjust the incline angle of the sled assembly 206 by actuating the incline adjustment lever 228 (thereby retracting the locking pins 224 from the respective pin holes of the base portion 204), and manually sliding the sled assembly 206 relative to the base portion 204 (via the front slide channel 216 and the rear slide channel 222) until the desired incline angle has been reached. The safety seat installer may then release the incline adjustment lever 228, thereby releasing the locking pins 224 into respective pin holes of the base portion 204 and locking the sled assembly 206 in position relative to the base portion 204.

Figure 9:
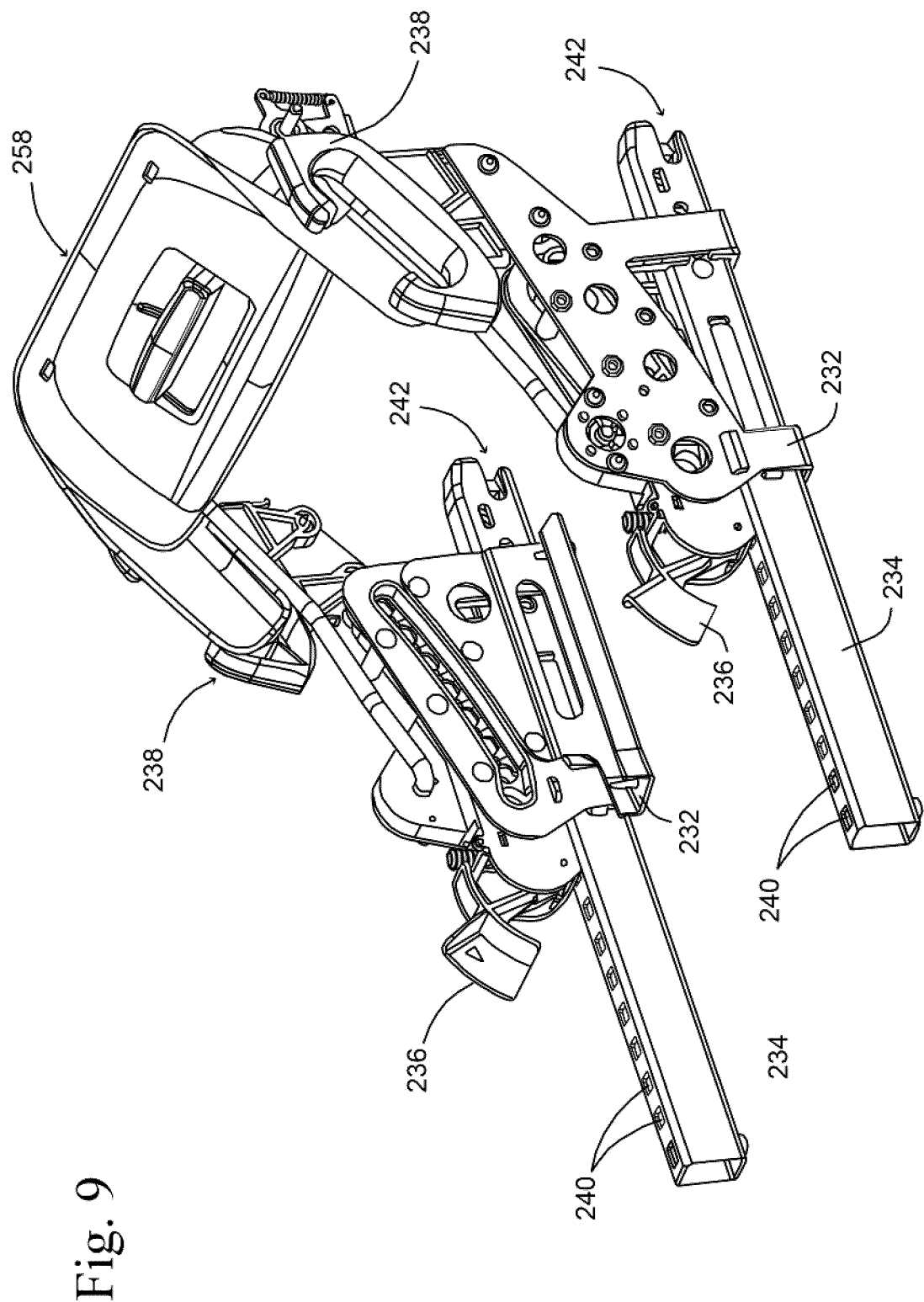
FIG. 9 is a top perspective view of the seat base, as depicted in FIG. 8, but with elements removed to be better show the rigid latch mechanism and the belt tensioning system.

As noted above, the child safety seat 100 may include a rigid latch mechanism. Therefore, as shown in FIG. 9, each base side 220 incorporates a respective rigid latch mechanism that includes a latch housing 232, an elongate latch member 234, and a latch release lever 236. Each latch housing 232 is rigidly secured to the respective base side 220, and may rigidly support a belt guide 238 that is secured thereto and configured to capture a vehicle belt extending across the base portion 204 via the belt guides 238.

Each latch member 234 is slidably captured within the respective latch housing 232 and may include a plurality of apertures 240 formed in the upper surface of the latch member 234. The latch release lever 236, when released, engages a respective one of the apertures 240 and thereby prevents the respective latch member 234 from moving within the latch housing 232. Conversely, the latch release lever 236, when actuated, retracts from the respective aperture 240 and thereby allows the respective latch member 234 to slide within the latch housing 232.

Each latch member 234 also incorporates a pair of opposed jaws 242 that are disposed at one end of the latch member 234, proximate the rear of the child safety seat 100, and are configured to capture a correspond LATCH system anchor on the vehicle. Each pair of jaws 242 is connected to the respective latch member 234 via a linkage mechanism that is disposed within the latch member 234. The linkage mechanism locks the jaws 242 in a closed position as the latch member 234 retracts into the latch housing 232, and allows the jaws 242 to open when the respective latch member 234 is extended from the latch housing 232. Therefore, the child safety seat 100 may be secured to the vehicle by manually extending the latch members 234 rearwardly from the safety seat 100, securing the latch members 234 to the vehicle anchors via the jaws 242, and sliding the child safety seat 100 on the vehicle seat cushion, rearwards towards the vehicle seat back (while actuating the latch release lever 236), thereby withdrawing the latch members 234 into the latch housings 232 and locking the jaws 242 to the vehicle anchors.

Figure 10:
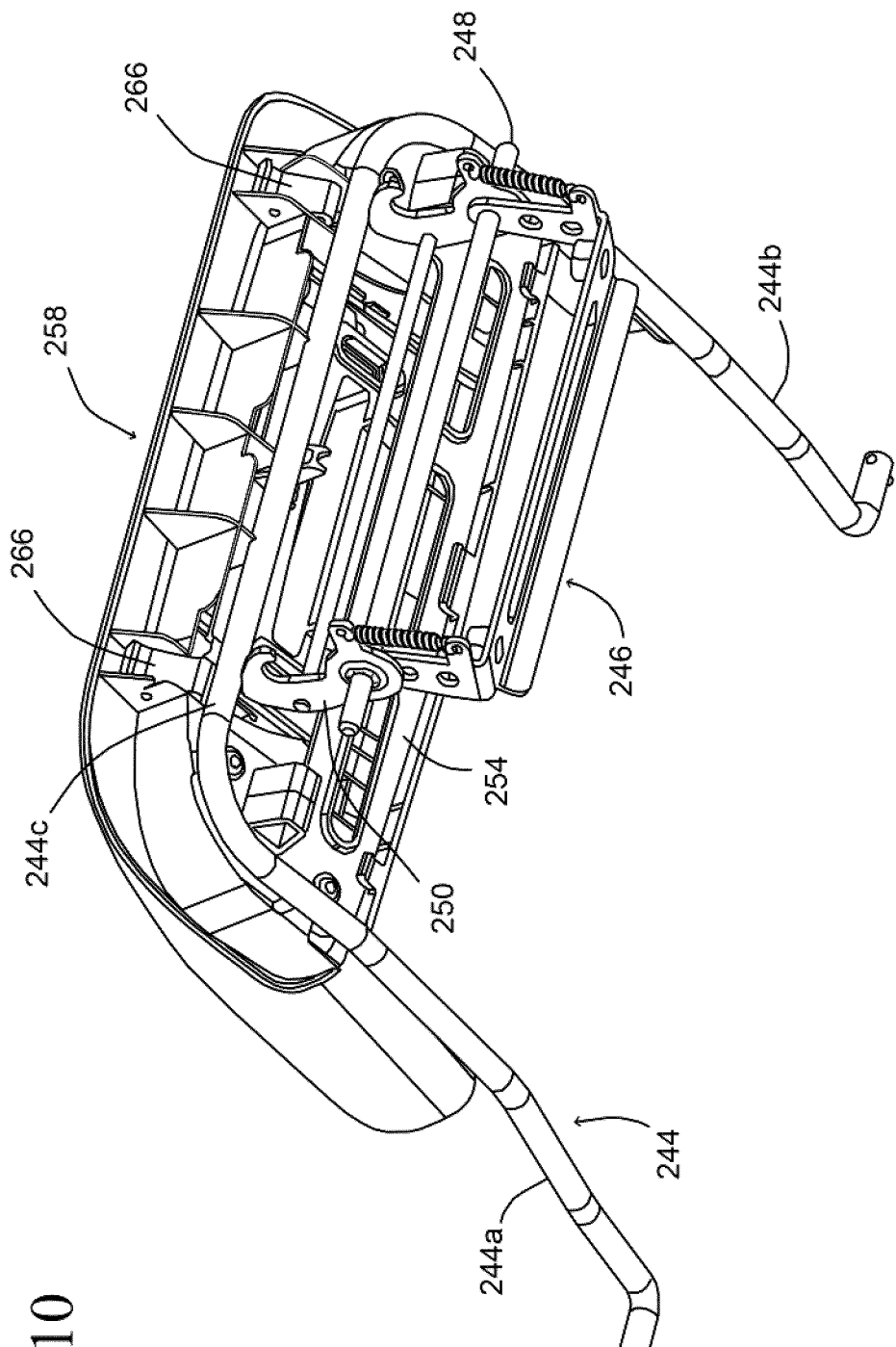
FIG. 10 is a bottom perspective view of the belt tensioning system, depicting the tensioning arm, the capture mechanism and the release mechanism in a pre-tension position.

The seat base 200 also includes a belt tensioning system that is configured to apply tension to a vehicle belt that is captured by the belt guides 238, and thereby firmly secure the base portion 204 to the vehicle seat. As shown in FIG. 10, the belt tensioning system includes a tensioning arm 244, a capture mechanism and a release mechanism. The tensioning arm 244 has a substantially U-shape and, therefore, includes a pair of substantially linear side arms 244a, 244b and a transverse arm 244c that is integral with and extends laterally between the side arms 244a, 244b. Each side arm 244a, 244b also extends laterally outwards at a respective end thereof, distal from the transverse side arm 244c. Each laterally-extending end is captured within a bushing (not shown) that is provided within a respective one of the respective latch housings 232. Therefore, the tensioning arm 244 is pivotably coupled to the base portion 204 (via the latch housings 232).

As will be explained, the tensioning arm 244 can be rotated (about an axis of rotation defined by the laterally-extending ends thereof) between a release position (see, e.g. FIG. 6) and an unloaded position, via a tension position (see, e.g. FIGS. 8, 13-15) that is disposed between the release position and the unloaded position. The tensioning arm 244, together with the capture mechanism, is configured to frictionally engage a vehicle belt that is disposed between the tensioning arm 244 and the base portion 204 when the tensioning arm 244 is disposed in the tension position (and thereby firmly secure the base portion 204 to the vehicle seat). The tensioning arm 244, together with the release mechanism, is also configured to allow the vehicle belt to become disengaged/released from the tensioning arm 244 when the tensioning arm 244 is disposed in the release position (and thereby allow the base portion 204 to be disengaged from the vehicle seat).

The tensioning arm 244 is also configured to frictionally engage the vehicle belt when the tensioning arm 244 is rotated into the unloaded position. As will be explained, when the tensioning arm 244 is disposed in the tension position, the vehicle belt will apply a load to the tensioning arm 244 and the capture mechanism. Therefore, prior to rotating the tensioning arm 244 from the tension position into the release position, the safety seat installer may rotate the tensioning arm 244 into the unloaded position to thereby reduce the load on the tensioning arm 244 and the capture mechanism (applied thereto via the tension in the vehicle belt) and thereby facilitate release of the tensioning arm 244 from the capture mechanism.

The capture mechanism includes a mounting frame 246, an axle member 248, and at least one A-hook 250, and may also include a rod that interconnects the A-hooks 250. The mounting frame 246 is fixed to the base portion 204 proximate the rear of the child safety seat 100. The axle member 248 is disposed between the side arms 244a, 244b of the tensioning arm 244. Further, the axle member 248 may be rotatably coupled to the mounting frame 246 (e.g. via bushings), and the A-hook(s) 250 may be fixed to the axle member 248. Alternately, the axle member 248 may be fixed to the mounting frame 246, and the A-hook(s) 250 may be rotatably coupled to the axle member 248. Therefore, each A-hook 250 is rotatably coupled to base portion 204 (via the mounting frame 246 and the axle member 248). Further, the axle member 248 extends along a pivot axis that is substantially parallel to the transverse arm 244c. Therefore, each A-hook 250 is rotatable about the pivot axis.

As will be explained, each A-hook 250 is rotatable (about the pivot axis) between (i) an engaged position (see, e.g. FIGS. 13-15) in which the tensioning arm 244 is disposed in the tension position (or the unloaded position) and is precluded by the capture mechanism from moving into the release position, and (ii) a disengaged position (see, e.g. FIGS. 16-18) in which the tensioning arm 244 is free to move from the unloaded position into the release position. The capture mechanism may also include at least one return spring 252 that extends between the mounting frame 246 and a respective one of the A-hooks 250, and urges the respective A-hook 250 to rotate into (return to) the engaged position from the disengaged position.

Figure 14:
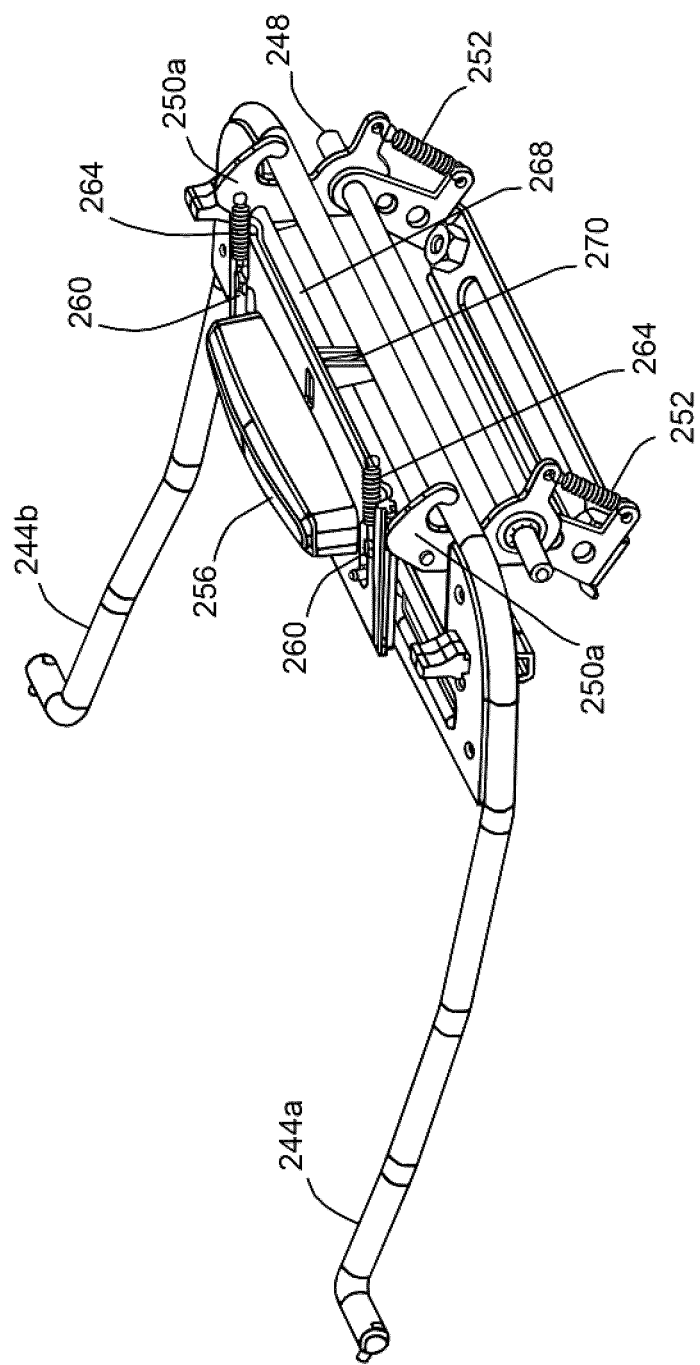
FIG. 14 is a top perspective view of the belt tensioning system as shown in FIG. 13, but with elements removed to be better show the capture mechanism and the release mechanism.
Figure 15:
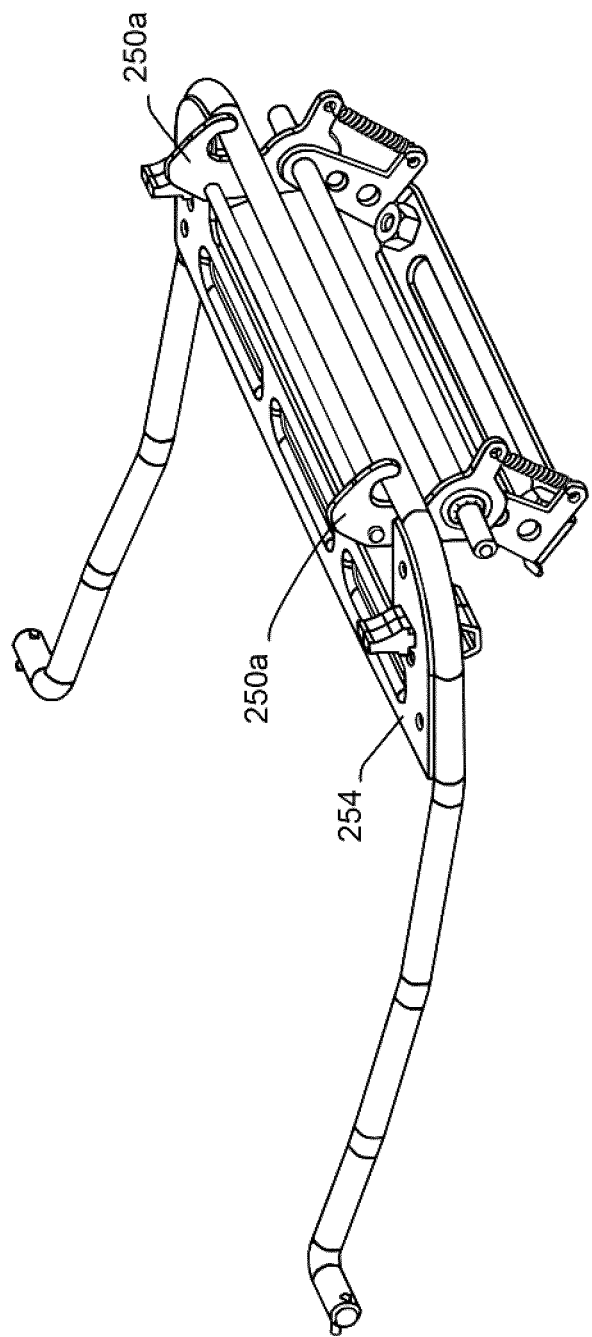
FIG. 15 is a top perspective view of the belt tensioning system as shown in FIG. 14, but depicted without the release mechanism.
Figure 16:
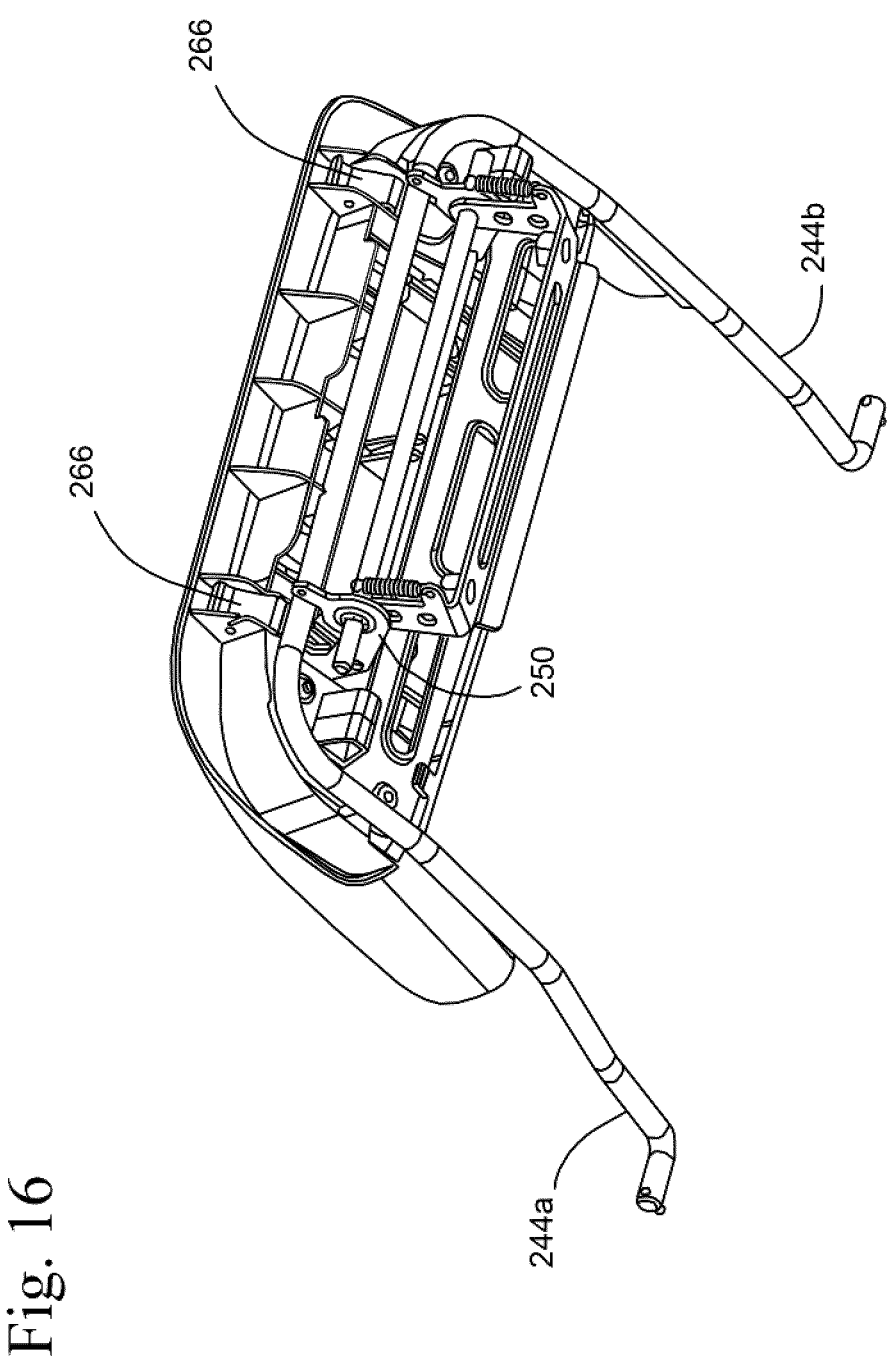
FIG. 16 is a bottom perspective view of the belt tensioning system, depicting the release mechanism and the capture mechanism in a disengaged position.

As shown in FIGS. 14 and 15, each A-hook 250 may include an apex portion 250a that is configured to capture the transverse arm 244c (and retain the transverse arm 244c therein) when the tensioning arm 244 is disposed in the tension position and the A-hook 250 is disposed in the engaged position. Conversely, as shown in FIGS. 17 and 18, the transverse arm 244c is disengaged from the A-hook 250 when the A-hook 250 is disposed in the disengaged position. Further, the lap belt or lap/shoulder belt will apply a load to the capture mechanism, via the tensioning arm 244 when the tensioning arm 244 is disposed in the tension position (and the A-hook 250 is disposed in the engaged position). Therefore, when the tensioning arm 244 is disposed in the tension position and the capture mechanism is disposed in the engaged position, the transverse arm 244c will be captured within the apex portion 250a and the A-hook(s) 250 may be precluded from moving into the disengaged position, until at least the load on the capture mechanism has been removed or reduced (e.g. until the tensioning arm 244 is rotated into the unloaded position).

The release mechanism is configured to release the tensioning arm 244 from the capture mechanism. Further, since the load (applied to the capture mechanism via the vehicle belt when the tensioning arm 244 is disposed in the loaded position and the capture mechanism is disposed in the engaged position) is only removed from the capture mechanism when the tensioning arm 244 is rotated into the unloaded position, the release mechanism may be configured to release the tensioning arm 244 from the capture mechanism only after the tensioning arm 244 is disposed in the unloaded position.

Figure 11:
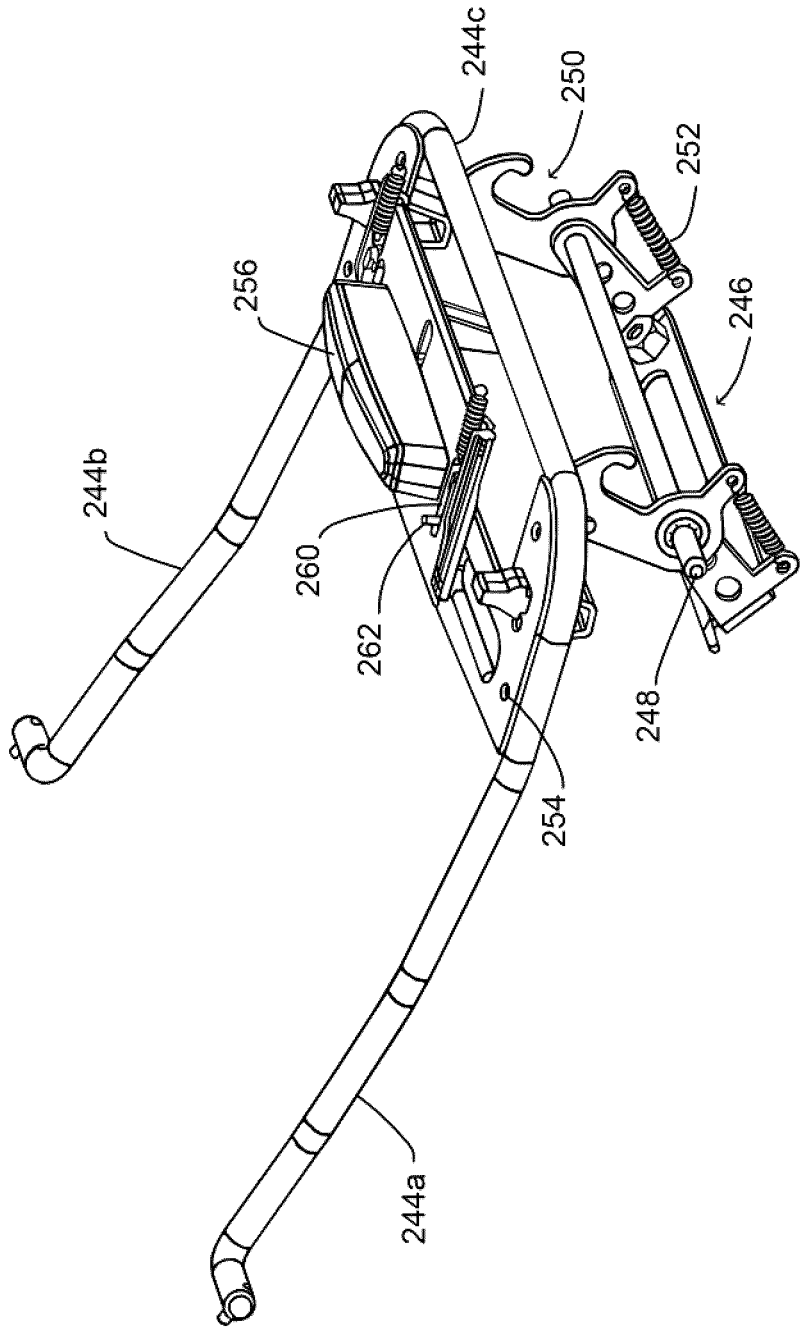
FIG. 11 is a top perspective view of the belt tensioning system as shown in FIG. 10, but with elements removed to be better show the capture mechanism and the release mechanism.
Figure 12:
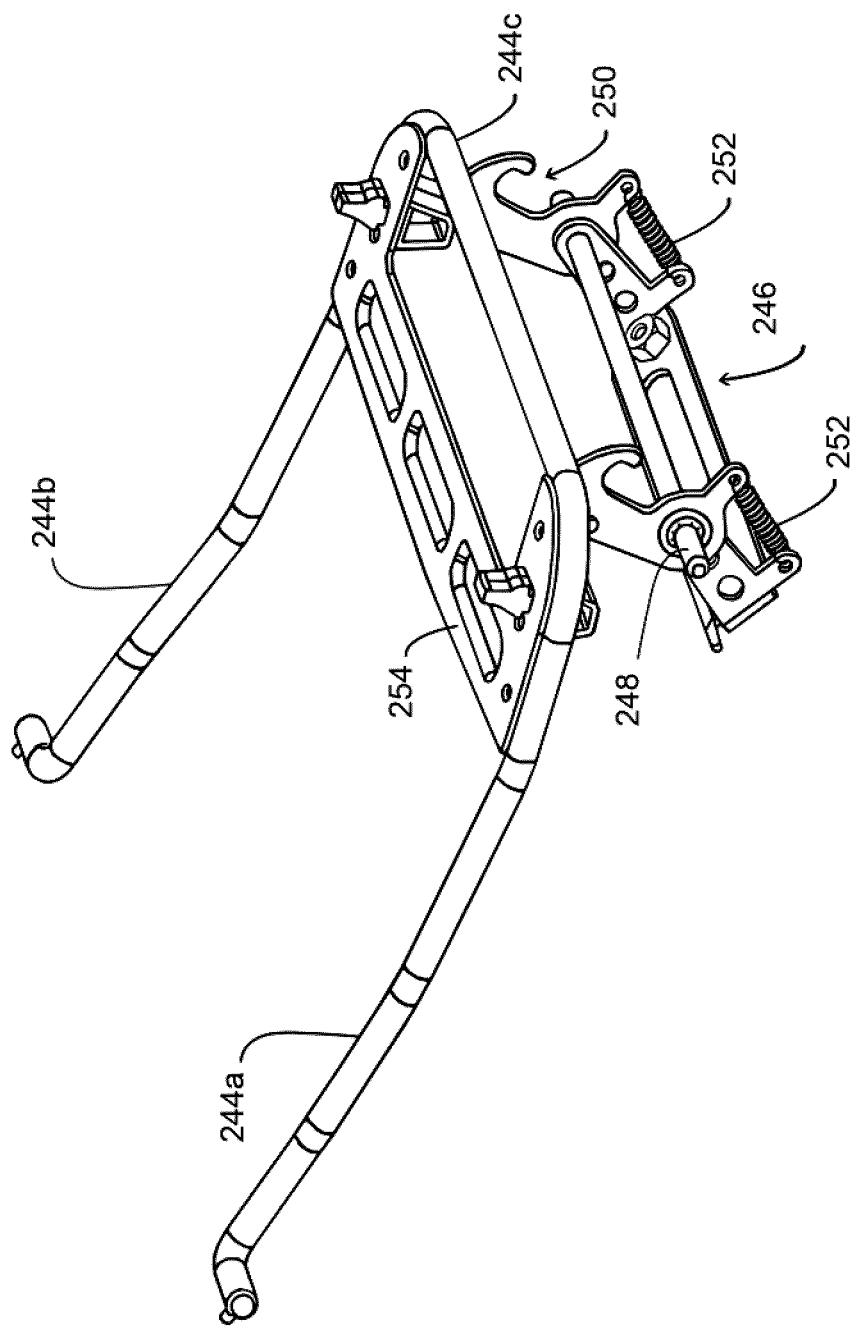
FIG. 12 is a top perspective view of the belt tensioning system as shown in FIG. 11, but depicted without the release mechanism.
Figure 13:
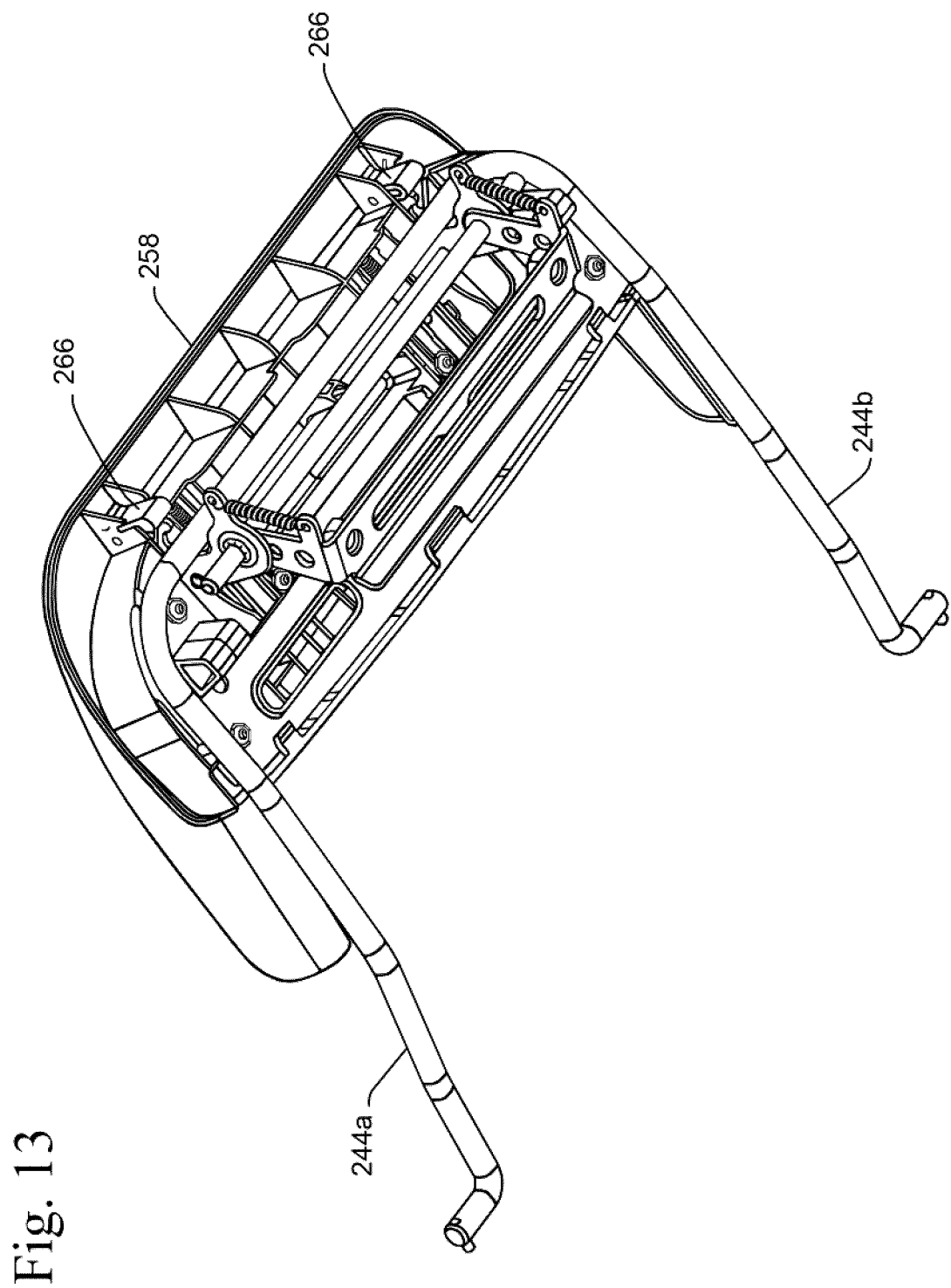
FIG. 13 is a bottom perspective view of the belt tensioning system, depicting the tensioning arm in the tension position, and depicting the release mechanism and the capture mechanism in an engaged position.

As shown in FIGS. 9-11, the release mechanism is provided on the tensioning arm 244, and includes a tray member 254, and a tension release lever 256, and may also include a cover member 258. The tray member 254 is secured to the side arms 244a, 244b, proximate the transverse arm 244c, and may support the tension release lever 256. The tray member 254 may include a pair of dowels 262 that extend from an upper surface of the tray member 254. The cover member 258 may be secured to the side arms 244a, 244b and the transverse arm 244c and cover the tray member 254 and the tension release lever 256.

The tension release lever 256 may include guide channels 260, disposed on opposite sides of the tension release lever 256. The guide channels 260 may retain a respective one of the dowels 262 therein, and thereby slidably couple the tension release lever 256 to the tray member 254.

As will be explained, the tension release lever 256 is slidably movable (relative to the tray member 254) between (i) a locked position in which the tension release lever 256 is disposed in proximity to the transverse arm 244c and (ii) an unlocked position in which the tension release lever 256 is disposed distally from the transverse arm 244c. The release mechanism may also include at least one return spring 264 that extends between the tension release lever 256 and the cover member 258, and urges the tension release lever 256 to slide into (return to) the locked position from the unlocked position.

The tray member 254 may also support at least one status indicator 266 (FIGS. 10, 13) that is visible through the apertures in the cover member 258 and configured to visually indicate whether the A-hook(s) 250 is/are disposed in the engaged position. The status indicator 266 may be rotatably coupled to the tray member 254, and each A-hook 250 may be configured to rotate a respective status indicator 266 from (i) an unlocked indicator position (see, e.g. FIG. 10), in which the A-hook 250 is disposed in the disengaged position and the apex portion 250a is displaced from the status indicator 266) into (ii) a locked indicator position (see, e.g. FIG. 13), in which the A-hook 250 is disposed in the engaged position and the apex portion 250a engages the status indicator 266).

As shown in FIG. 17, the capture mechanism may include a connecting rod 268 that extends between and interconnects the A-hooks 250 (where the capture mechanism includes more than one A-hook 250), and the tension release lever 256 may include a finger 270 that extends towards the capture mechanism. In this implementation, the finger 270 is be configured to engage the connecting rod 268 and urge the A-hooks 250 out of the engaged position (e.g. when the tensioning arm 244 is disposed in the unloaded position) into the disengaged position, as the tension release lever 256 is moved from the locked position into the unlocked position. Further, the finger 270 is displaced from the connecting rod 268 when the tension release lever 256 is disposed in the locked position. Therefore, the capture mechanism is normally urged into the engaged position (e.g. via the return spring(s) 264), and is held in the disengaged position only when the release mechanism is held in the unlocked position.

The foregoing configuration of the capture mechanism and the release mechanism is particularly advantageous since the capture mechanism may be rotated from the disengaged position into the engaged position (when the release mechanism is disposed in the locked position). As a result, the safety seat installer may secure the child safety seat 100 to the vehicle seat by extending a vehicle belt across the base portion 204, via the belt guides 238, and rotating the tensioning arm 244 into the tension position (and thereby capturing the vehicle belt between the tensioning arm 244 and the base portion and applying tension to the vehicle belt), all without manipulating the release mechanism (i.e. without having to move the tension release lever 256 into the locked position).

Having described the child safety seat 100 and the belt tensioning system, the mechanism by which the child safety seat 100 may be installed in a vehicle will now be described.

As discussed, the child safety seat 100 may be installed in a motor vehicle by placing the seat base 200 on a vehicle seat, and securing the seat base 200 to the motor vehicle by, for example, extending the latch members 234 rearwardly from the seat base 200, securing the latch members 234 to the LATCH system vehicle anchors via the jaws 242, and sliding the seat base 200 on the vehicle seat cushion, rearwards towards the vehicle seat back, while actuating the latch release lever 236.

The safety seat installer may then use the belt tensioning system to firmly secure the seat base 200 to the vehicle seat. If the tensioning arm 244 is disposed in the tension position, the safety seat installer may release the tensioning arm 244 from the capture mechanism by rotating the tensioning arm 244 into the unloaded position (e.g. by pressing downwards on the cover member 258), moving the tension release lever 256 into the unlocked position from the locked position (and thereby releasing the tensioning arm 244 from the capture mechanism). The safety seat installer may then rotate the tensioning arm 244 away from the unloaded position into the release position, and release the tension release lever 256 (thereby allowing the tension release lever 256 to return to the locked position).

After the tensioning arm 244 has been rotated into the release position, the safety seat installer may connect a vehicle belt to the seat base 200 by drawing the vehicle belt across the base portion 204 and through the belt guides 238, and rotating the tensioning arm 244 into the tension position. As the tensioning arm 244 rotates into the tension position, the transverse arm 244c travels downwards along the apex portion 250a of the A-hook(s) 250, causing the A-hook(s) 250 to rotate away from the engaged position, towards the disengaged position. After the transverse arm 244c travels past the apex portion 250a, the return springs 252 cause the A-hook(s) 250 to return to the engaged position, thereby causing the apex portion(s) 250a to retain the transverse arm 244c in the A-hook(s) 250 and the A-hook(s) 250 to rotate the status indicator(s) 266 into the locked indicator position.

While tensioning arm 244 is disposed in the tension position, the tensioning arm 244 applies tension to the vehicle belt, thereby firmly securing the seat base 200 to the vehicle seat. The tensioning arm 244 is locked in the tension position by the apex portion(s) 250a, and the A-hook(s) 250 are precluded from rotating into the disengaged position by the shape of the apex portion(s) 250a and the load that is applied to the tensioning arm 244 and the A-hook(s) 250 by the vehicle belt.

After the tensioning arm 244 has been locked in the tension position, and the seat base 200 has been secured to the vehicle seat via the tension in the vehicle belt, the safety seat installer may subsequently disengage the seat base 200 from the vehicle seat rotating the tensioning arm 244 into the unloaded position (e.g. by pressing downwards on the cover member 258). When the tensioning arm 244 is in the unloaded position, the tensioning arm 244 still applies tension to the vehicle belt. However, when the tensioning arm 244 is in the unloaded position, the transverse arm 244c is displaced from the apex portion(s) 250a and, therefore, the load on the A-hook(s) 250 is reduced in comparison to that when the tensioning arm 244 is in the tension position. The safety seat installer may then release the tensioning arm 244 from the capture mechanism by moving the tension release lever 256 into the unlocked position from the locked position, thereby causing the finger 270 to engage the connecting rod 268 and urge the A-hooks 250 out of the engaged position into the disengaged position.

After the A-hooks 250 are disposed in the disengaged position, the safety seat installer may then rotate the tensioning arm 244 away from the unloaded position into the release position, and release the vehicle belt from the belt guides 238.

The invention claimed is:

1. A seat base for a child safety seat comprising:
a base portion; and
a belt tensioning system,
wherein the belt tensioning system includes:
a tensioning arm pivotably coupled to the base portion and movable through a release position, a tension position and an unloaded position, the tensioning arm being configured to frictionally engage a vehicle belt disposed between the tensioning arm and the base portion when the tensioning arm is disposed in the tension and unloaded positions, the belt being disengaged from the tensioning arm when the tensioning arm is disposed in the release position; and
a release mechanism coupled to the tensioning arm; and
a capture mechanism coupled to the base portion and movable between (i) an engaged position in which the tensioning arm is precluded by the capture mechanism from moving into the release position, and (ii) a disengaged position in which the tensioning arm is free to move into the release position,
wherein, when the tensioning arm is disposed in the tension position and the capture mechanism is disposed in the engaged position, the belt applies a load to the capture mechanism via the tensioning arm and the capture mechanism is precluded from moving into the disengaged position, and
wherein the release mechanism is configured to release the tensioning arm from the capture mechanism when the tensioning arm is disposed in the unloaded position, the load being removed from the capture mechanism when the tensioning arm is disposed in the unloaded position.

2. The seat base according to claim 1, wherein:
the release mechanism is movable between a locked position and an unlocked position;

the capture mechanism is movable from the disengaged position into the engaged position when the release mechanism is disposed in the locked position; and the capture mechanism is locked in the disengaged position when the release mechanism is disposed in the unlocked position.

3. The seat base according to claim 2, wherein:

the release mechanism is configured to urge the capture mechanism into the disengaged position from the engaged position when the tensioning arm is disposed in the unloaded position and the release mechanism is moved from the locked position into the unlocked position.

4. The seat base according to claim 3, wherein:

the capture mechanism includes a hook rotatable about a pivot axis between (i) the engaged position in which the hook captures the tensioning arm and (ii) the disengaged position in which the tensioning arm is disengaged from the hook, the hook including an apex portion; and the tensioning arm is captured within the apex portion when the tensioning arm is disposed in the tension position and is disposed distally from the apex portion when the tensioning arm is disposed in the unloaded position.

5. The seat base according to claim 4, wherein:

the capture mechanism includes at least two of the hooks, and a rod interconnecting the at least two hooks; and the release mechanism includes a finger configured to engage the rod and rotate the at least two hooks from the engaged position into the disengaged position when the tensioning arm is disposed in the unloaded position and the release mechanism is moved from the locked position into the unlocked position.

6. A child safety seat comprising:

a seat base; and a seat body detachably coupled to the seat base;

wherein the seat base includes:

a base portion; and a belt tensioning system, wherein the belt tensioning system includes:

a tensioning arm pivotably coupled to the base portion and movable through a release position, a tension position and an unloaded position, the tensioning arm being configured to frictionally engage a vehicle belt disposed between the tensioning arm and the base portion when the tensioning arm is disposed in the tension and unloaded positions, the belt being disengaged from the tensioning arm when the tensioning arm is disposed in the release position; and a release mechanism coupled to the tensioning arm; and a capture mechanism coupled to the base portion and movable between (i) an engaged position in which the tensioning arm is precluded by the capture mechanism from moving into the release position, and (ii) a disengaged position in which the tensioning arm is free to move into the release position, wherein, when the tensioning arm is disposed in the tension position and the capture mechanism is disposed in the engaged position, the belt applies a load to the capture mechanism via the tensioning arm and the capture mechanism is precluded from moving into the disengaged position, and wherein the release mechanism is configured to release the tensioning arm from the capture mechanism when the tensioning arm is disposed in the unloaded position, the load being removed from the capture mechanism when the tensioning arm is disposed in the unloaded position.

7. The child safety seat according to claim 6, wherein:

the release mechanism is movable between a locked position and an unlocked position;

the capture mechanism is movable from the disengaged position into the engaged position when the release mechanism is disposed in the locked position; and the capture mechanism is locked in the disengaged position when the release mechanism is disposed in the unlocked position.

8. The child safety seat according to claim 7, wherein:

the release mechanism is configured to urge the capture mechanism into the disengaged position from the engaged position when the tensioning arm is disposed in the unloaded position and the release mechanism is moved from the locked position into the unlocked position.

9. The child safety seat according to claim 8, wherein:

the capture mechanism includes a hook rotatable about a pivot axis between (i) the engaged position in which the hook captures the tensioning arm and (ii) the disengaged position in which the tensioning arm is disengaged from the hook, the hook including an apex portion; and the tensioning arm is captured within the apex portion when the tensioning arm is disposed in the tension position and is disposed distally from the apex portion when the tensioning arm is disposed in the unloaded position.

10. The child safety seat according to claim 9, wherein:

the capture mechanism includes at least two of the hooks, and a rod interconnecting the at least two hooks; and the release mechanism includes a finger configured to engage the rod and rotate the at least two hooks from the engaged position into the disengaged position when the tensioning arm is disposed in the unloaded position and the release mechanism is moved from the locked position into the unlocked position.

\* \* \* \* \*